July 1, 1958 J. M. AUZIN 2,841,166
COMBINATION VALVE AND PLUG
Filed Dec. 30, 1955
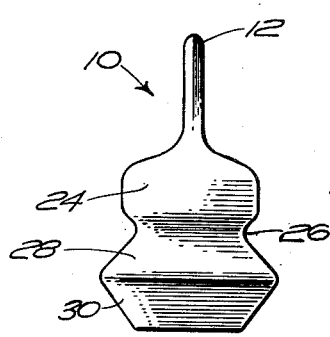
FIG. 1
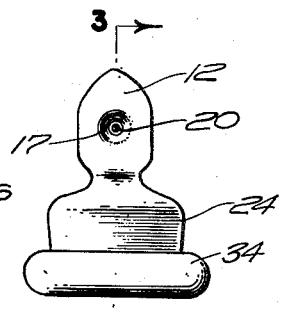
FIG. 2
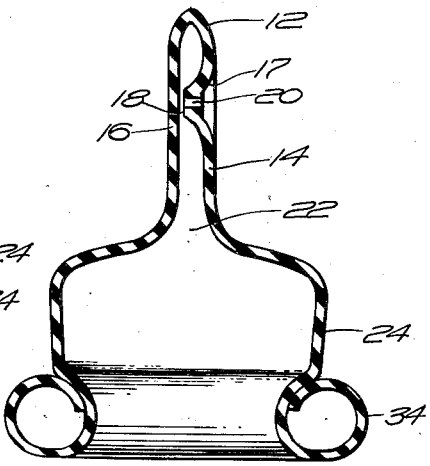
FIG. 3
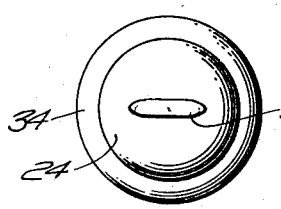
FIG. 4
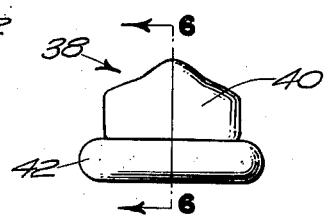
FIG. 5
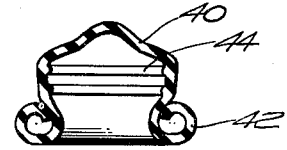
FIG. 6
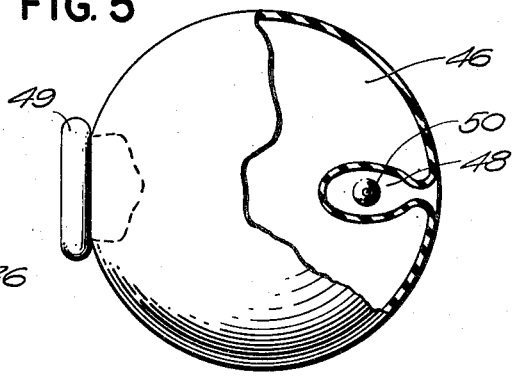
FIG. 7
FIG. 8
INVENTOR.
JOHN M. AUZIN
BY
Nathaniel Frucht
ATTORNEY United States Patent Office 2,841,166
Patented July 1, 1958

2,841,166

COMBINATION VALVE AND PLUG

John M. Auzin, Whitman, Mass.

Application December 30, 1955, Serial No. 556,641

5 Claims. (Cl. 137—223)

The present invention pertains generally to a combination valve and plug and more specifically to a device of this type which may be manufactured of rubber latex or the like, preferably by a dipping process.

A primary object of the instant invention is the provision of a dipped rubber valve and plug insert which is of particular value in connection with air and other fluid-filled objects.

Another object of the instant invention is the provision of a dipped rubber valve which will allow passage of a fluid medium therethrough but which will prevent the escape of said fluid subject to the building up of a sufficient pressure.

Still another object is the provision of a valve of particular value in connection with air-inflated objects and the like which allows the entrance of air into said object but prevents the air from escaping, the effectiveness of the latter function increasing with the rise of pressure within said object.

A further object is the provision of a valve of the character described which may very easily be manipulated to allow air or the like to escape therethrough.

Another object in the instant invention is the provision of a dipped rubber valve and plug insert which has a novel air-cushion flange associated therewith.

A further object of the instant invention is the provision of a combination valve and plug which has particular adaptability in connection with so-called "squeeze toys" in that it acts as a breathing valve therefor, since any air inadvertently lost during the squeeze operation will be compensated for as the toy moves back to its normal position.

A further object is the provision of a combination valve and plug which is simple and economically feasible to manufacture but which nevertheless is durable and efficient in operation.

Still another object is the provision of a combination soft rubber plug that can be made from latex by the dipping process, and which once formed, does not require any trimming, and which further does away with the necessity of expensive presses, rubber mills and other costly equipment.

Other objects, features and advantages of the invention will become apparent as the description thereof proceeds when considered in connection with the accompanying illustrative drawings.

In the drawings which illustrate the best mode presently contemplated by me for carrying out my invention:

Fig. 1 is a front elevation of a combination valve and plug constructed in accordance with the instant invention;

Fig. 2 is a side elevation thereof with the air-cushion flange rolled into operative position;

Fig. 3 is an enlarged section taken on line 3—3 of Fig. 2;

Fig. 4 is a plan view thereof;

Fig. 5 is a side elevation of the plug per se constructed in accordance with the instant invention;

Fig. 6 is a section taken on line 6—6 of Fig. 5;

Fig. 7 is a side view of a rubber toy, broken away for purposes of illustration, showing my combination valve and plug operatively mounted therein; and Fig. 8 is a side view of a rubber toy, broken away for purposes of illustration, showing my novel valve structure as an integral part thereof.

It has been found desirable to provide a combination valve and plug of primary utility in connection with inflated objects and the like, such as squeeze toys, etc. More specifically, in toys of the type wherein when a portion thereof is squeezed, another portion pops out, a valve constructed in accordance with the instant invention has been found to be quite advantageous in use as a form of breathing valve. Thus, when a toy of this type is squeezed, should any air be inadvertently lost, the instant apparatus will enable said lost air to be replaced. The instant invention is also of utility in connection with other rubber and plastic toys and the like and provides highly efficient means for maintaining the air therein while at the same time facilitating the removal of said air should such be desirable. Thus there has been provided in accordance with the invention now to be described a combination valve and plug which preferably is made by the dip process but which may be molded of soft rubber thereby maintaining manufacturing costs at a minimum, and which further is simple and efficient in operation.

Referring now to the drawings, and more particularly to Figs. 1 through 4 thereof, there is provided a combination valve and plug generally designated at 10, and preferably formed of dipped or molded soft rubber. The device 10 comprises an enclosed valve chamber 12 having oppositely disposed side walls 14 and 16. As will be seen most clearly from Fig. 3, the walls 14 and 16 are in spaced relation with respect to each other, and the wall 14 is provided with an integral inwardly extending portion 17. It will be noted that the portion 17 has a flat surface 18 in parallel relation with respect to the opposite wall 16 and very slightly spaced therefrom. It will further be noted that an aperture 20 is provided in the wall 18 and that the entire inwardly extending portion 17 is somewhat thicker than the remainder of the wall of the valve chamber 12.

As will be seen most clearly in Fig. 1, the valve chamber 12 at its lower open end 22 merges with a body member comprising a substantially cylindrical upper section 24, which in turn merges with a lower section having an annular depression 26, an outwardly flaring skirt portion 28, and a converging skirt portion 30. Due to the particular configuration of the lower section of the body member, the lower portion thereof may be externally rolled upon itself to provide an air-cushion flange 34, as shown in Figs. 2 and 3. Because of the outwardly and inwardly flaring skirt portions, once the air-cushion flange 34 has been manually rolled, it will tend, in effect, to snap into this position and retain itself so disposed.

Referring to Fig. 7, the device 10 is shown in operative position within an air-filled object of some sort 36. It will be understood that the device 36 has an opening in its wall to receive the valve and plug 10 with the valve chamber and upper body section of the latter disposed within the wall of the object 36, while the air-cushion flange 34 is disposed on the exterior thereof. In use, air may be introduced through the device 10, whereupon it will enter into the object 36 by means of aperture 20. Once sufficient pressure has built up within the object 36, wall 18 will be forced against the oppositely disposed side wall 16 whereby to seal off the aperture 20 and thereby prevent the escape of any air from within the said object. Additional air may be introduced at any time, since the entry thereof, under pressure, will force the wall 18 away from the wall 16 whereby the air is free to pass through the valve. It will be obvious that the higher the pressure of the air within the object, the more secure is the valve against the escape thereof, and the fact that only the adjacent surface to aperture 20, namely, the wall portion 18, engages the opposite wall 16 results in a more localized and hence effective sealing means. The increased thickness of the inwardly extending portion 17 simply aids in providing a more secure sealing action since it imparts additional rigidity to the wall portion 18. If at any time it is desired to allow the escape of air from the object 36, it is only necessary to insert some sort of elongated stud (not shown) into the valve chamber 12 whereby to spread apart wall portion 18 from side wall 16 thereby unsealing aperture 20. The air-cushion flange 34 is disposed snugly against the outer surface of the object 36 slightly under compression, thereby functioning to prevent air from inadvertently escaping from within the object. It will be understood that the device 10 is secured to the object 36 by any suitable means, such as cementing or the like, but should the bonding means fail to effectuate a completely air-tight seal, the pressure exerted by the aforedescribed flange 34 will act, in effect, as additional means for preventing the undesirable egress of air, and should there be any irregularities in the contour of the object 36 adjacent the device 10, the air-cushion flange 34 will conform to such irregularities and still perform its sealing function. In the act of cementing, cement may be applied either to the plug 10 or the object 36, and the plug element 10 is pushed into the object far enough so that pressure is applied to the air-cushion flange 34. The air-cushion flange being under slight pressure, will insure a good bond as the cement becomes dry.

Referring now to Figs. 5 and 6, there is shown a plug 38 similar to the device 10 aforedescribed except for the fact that the valve, per se, is eliminated. In other words, the device 38 functions only as a plug for use in air-enclosed objects and the like, and is provided with a closed body portion 40 and an air-cushion flange 42 of the type aforedescribed. The device 38 is also preferably constructed of dipped soft rubber and may be provided with peripheral ribs 44 simply to impart additional rigidity to the structure. Since the operation and use of the plug 38 is thought to be obvious from the foregoing description set forth in connection with the device 10, no further discussion thereof will be entered into at this time, although it will be understood that body portion 40, instead of being completely closed, could be provided with a whistle or the like for creating a noise as air enters or leaves the object with which said plug is associated.

In Fig. 8 there is shown a resilient air-inflatable toy 46 having an integral valve 48 provided therein. It will be understood that valve 48 is identical in construction with the valve structure of the device 10, the only difference being that no air-cushion flange is utilized, but rather the valve is formed as an integral part of the air-inflatable object. The toy 46 may take the form of a squeeze toy, such as described in applicant's United States Patent No. 2,668,394, and would comprise a separate plug 49 whereby the toy may be turned inside-out in order to accomplish the dipping operation necessary for the construction of valve 48. In use, air is introduced to the toy 46 through the valve 48, and the pressure built up within the toy will serve to seal off the opening 50, all in a manner aforedescribed. To deflate the toy 46, an elongated stud or the like is inserted into valve 48, thereby unsealing aperture 50.

Thus it will be seen that there is provided in accordance with the instant invention a combination valve and plug which is of prime utility in connection with air-inflatable objects and the like. It will be obvious that the valve may be used per se without the air-cushion flange, as per the modification of Fig. 8, or on the other hand, the plug, as described in Figs. 5 and 6, has a utility per se. It will be understood that, if desired, aperture 20 could be located in the wall 16, since the basic principle of the instant invention resides in the provision of a resilient valve, the chamber walls of which, upon the application of sufficient pressure, will be caused to collapse against each other thereby sealing off the aperture. Thus the specific location of the aperture is not critical, although in use, the best action has been found to exist when the aperture is located in the thickened inwardly extending wall portion. Also, by making the valve and plug of soft rubber latex for use primarily in toys of like material, the adhesion between the plug and the toy is maximum when the former is cemented, for example, in the latter. Certainly, the adhesion between a latex plug and a latex toy is greater than if a hard press-molded plug were to be used.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. A combination valve and plug for air-inflatable objects and the like comprising a resilient valve chamber having a pair of oppositely disposed side walls in spaced relation, the inner surface of one of said side walls having an inwardly extending portion which lies closely adjacent the opposite wall, said portion being provided with an aperture therein, whereby the application of an external pressure on said resilient chamber will cause said portion to collapse against said opposite wall to seal off said aperture, said valve further comprising a hollow resilient body member having an upper section of substantially cylindrical configuration, and a lower section comprising an annular depression which merges with an outwardly flaring skirt portion which in turn merges with a converging skirt portion, whereby said converging skirt portion is adapted to be rolled externally on said outwardly flaring portion to provide an air-cushion flange around the periphery of said annular depression.

2. A combination valve and plug as set forth in claim 1 further characterized in that it is integrally constructed of soft rubber.

3. A plug for air-inflatable objects and the like comprising a hollow, resilient body portion of constant wall thickness, said body portion being closed at one end and having at its other end an annular depression merging with an outwardly flaring skirt portion and terminating in a converging skirt portion, whereby said converging skirt portion is adapted to be rolled externally on said outwardly flaring portion to provide an air-cushion flange around the periphery of said annular depression.

4. A valve of the character described comprising a resilient valve chamber having normally spaced generally parallel walls, one of said walls having a portion extending toward the other wall and normally spaced therefrom a distance appreciably less than the afore defined wall spacing, said portion being of greater thickness than the remainder of the chamber walls and having an aperture disposed therein, whereby the application of external pressure on said resilient chamber will cause said portion to bear tightly against said opposite wall and seal off said aperture.

5. A valve of the character described comprising a resilient valve chamber having normally spaced generally parallel walls, one of said walls having a portion extending toward the other wall and normally spaced therefrom a distance appreciably less than the afore defined wall spacing, said portion being of greater thickness than the remainder of the chamber walls and having an aperture disposed therein, whereby the application of external pressure on said resilient chamber will cause said portion to bear tightly against said opposite wall and seal off said aperture, said valve further comprising a hollow body portion in communication with said valve chamber, the free edge of said body portion having an externally rolled air-cushion flange.

References Cited in the file of this patent

UNITED STATES PATENTS

| | | |
|---|---|---|
| 2,072,366 | Hein | Mar. 2, 1937 |
| 2,700,980 | Andrews | Feb. 1, 1955 |

FOREIGN PATENTS

| | | |
|---|---|---|
| 138,306 | Great Britain | May 6, 1920 |
| 643,936 | Great Britain | Sept. 27, 1950 |
| 993,831 | France | July 25, 1951 |
| 62,770 | France | Feb. 9, 1955 |
| | (Addition to No. 1,026,370) | |